(12) United States Patent
Sasaki et al.

(10) Patent No.: US 9,056,267 B2
(45) Date of Patent: Jun. 16, 2015

(54) FILTRATION DEVICE

(75) Inventors: Tsutomu Sasaki, Shiga (JP); Satoshi Sasaki, Shiga (JP)

(73) Assignee: Basic Co., Ltd., Shiga (JP)

( * ) Notice: Subject to any disclaimer, the term of this patent is extended or adjusted under 35 U.S.C. 154(b) by 0 days.

(21) Appl. No.: 14/122,682

(22) PCT Filed: May 30, 2012

(86) PCT No.: PCT/JP2012/063961
§ 371 (c)(1),
(2), (4) Date: Nov. 27, 2013

(87) PCT Pub. No.: WO2012/165490
PCT Pub. Date: Dec. 6, 2012

(65) Prior Publication Data
US 2014/0110330 A1   Apr. 24, 2014

(30) Foreign Application Priority Data

May 30, 2011  (JP) ................................. 2011-120904

(51) Int. Cl.
*B01D 29/60*  (2006.01)
*B01D 29/66*  (2006.01)
(Continued)

(52) U.S. Cl.
CPC ............. *B01D 29/668* (2013.01); *C02F 1/001* (2013.01); *C02F 2201/007* (2013.01); *C02F 2303/16* (2013.01); *B01D 29/52* (2013.01); *B01D 29/60* (2013.01); *C02F 2201/005* (2013.01)

(58) Field of Classification Search
CPC .... B01D 29/682; B01D 29/68; B01D 29/668; B01D 29/60; F16K 31/00; F16K 11/85; F16K 11/00; F16K 11/02; F16K 11/072; F16K 11/078; F16K 31/14; F16K 31/60; F16K 99/0028; C02F 2303/16; C02F 1/001; C02F 2201/007
See application file for complete search history.

(56) References Cited

U.S. PATENT DOCUMENTS 6,533,244 B1 * 3/2003 Falkner ......................... 251/344
2010/0116647 A1   5/2010 Kornmuller et al.

FOREIGN PATENT DOCUMENTS

DE       3327184 A  *  2/1985  ............. B01D 29/00
JP       63-189315 U    12/1988
(Continued)

OTHER PUBLICATIONS

Merriam webster, definition of word "block", searched Jun. 19, 2014.*
(Continued)

*Primary Examiner* — Lucas Stelling
*Assistant Examiner* — Rohit K Dewan
(74) *Attorney, Agent, or Firm* — Keating & Bennett, LLP

(57) ABSTRACT

A filtration device with filters that can be backwashed with purified water switches between water purification, first backwashing, and second backwashing modes, depending on a pivot position of a valve. During the first backwashing mode, while a tap water inlet is in communication with a second tap water passage port, first and second purified water passage ports are blocked from communication with a purified water outlet, so purified water from a second filter flows backward through a first filter and is discharged from a drain water outlet. During the second backwashing mode, while the tap water inlet is in communication with a first tap water passage port, first and second purified water passage ports are blocked from communication with the purified water outlet, so purified water from the first filter flows backward through the second filter and is discharged from the drain water outlet.

2 Claims, 10 Drawing Sheets

(51) Int. Cl.
  *B01D 29/52*   (2006.01)
  *C02F 1/00*   (2006.01)

(56) References Cited

FOREIGN PATENT DOCUMENTS

| JP | 03-224609 A | 10/1991 |
| JP | 06-313504 A | 11/1994 |
| JP | 11-009909 A | 1/1999 |
| JP | 2002-263412 A | 9/2002 |
| JP | 2003-093808 A | 4/2003 |
| JP | 2008-132430 A | 6/2008 |
| JP | 2010-504209 A | 2/2010 |
| JP | 2010-253418 A | 11/2010 |

OTHER PUBLICATIONS

Translation of Steffen DE3327184A ("Backwashable filter apparatus") from espacenet.*
Official Communication issued in International Patent Application No. PCT/JP2012/063961, mailed on Sep. 4, 2012.

* cited by examiner

FILTRATION DEVICE

TECHNICAL FIELD

The present invention relates to a filtration device with a plurality of filters for filtering and purifying tap water.

BACKGROUND ART

Filtration devices with filters for filtering and purifying tap water have conventionally been widely used. However, relatively long-term use of such a filter causes a decrease in filtering performance due to trapped impurities (e.g., inorganic particles, etc.) therein. Thus, there are known some filtration devices that are capable of removing the impurities by causing purified water, which is obtained by filtration of tap water by the filters, to flow backward to filters according to backwashing methods.

As a backwashing method, there is a method for pooling some purified water in a tank beforehand and then causing the purified water to flow backward to a filter when backwashing needs to be performed. This method, however, requires such a device as a tank, leading to an increase in size of the entire filtration system. For this reason, there is proposed a method that can avoid the increase in size of the system by providing two filters in parallel and switching a water current using a switching valve so that some of purified water in one of the filters can flow backward to the other filter (Patent Documents 1 and 2 , for example).

PRIOR ART DOCUMENTS

Patent Documents

Patent Document 1: Japanese Patent Application Publication No. 2008-132430
Patent Document 2: Japanese Patent Application Publication No. 2010-253418

SUMMARY OF THE INVENTION

Problem To Be Solved By The Invention

According to the conventional backwashing method, unfortunately, those many switching valves need to be switched in a predetermined order each time when backwashing needs to be performed, which is an extremely complicated task and is likely to generate operational errors.

The present invention was contrived in view of such circumstances, and an object thereof is to provide a filtration device having a plurality of filters that can be backwashed with purified water with a simple operation.

Means for Solving the Problem

In order to achieve this object, a filtration device according to a preferred embodiment of the present invention has: a water current selector, which is configured by a water current selector main body that has, on an outer wall surface thereof, a tap water inlet receiving a flow of tap water, first and second tap water passage ports, first and second purified water passage ports, a purified water outlet, and a drain water outlet, and a valve that is pivotally fitted in a hollow formed in the water current selector main body; a first filter that has a first tap water pipe and a first purified water pipe connected to the first tap water passage port and the first purified water passage port, respectively; and a second filter that has a second tap water pipe and a second purified water pipe connected to the second tap water passage port and the second purified water passage port, respectively, wherein: when the valve is in a pivot position corresponding to a water purification mode, the tap water inlet is in communication with the first and second tap water passage ports, and the first and second purified water passage ports are in communication with the purified water outlet, so that tap water is filtered by the first and second filters and the resultant purified water flows out of the purified water outlet to the outside; when the valve is in a pivot position corresponding to a first backwashing mode, while the tap water inlet is in communication with the second tap water passage port and the drain water outlet is in communication with the first tap water passage port, the first and second purified water passage ports are blocked from communication with the purified water outlet, so that tap water is filtered by the second filter, and the resultant purified water flows backward through the first filter and is discharged as drain water from the drain water outlet; and when the valve is in a pivot position corresponding to a second backwashing mode, while the tap water inlet is in communication with the first tap water passage port and the drain water outlet is in communication with the second tap water passage port, the first and second purified water passage ports are blocked from communication with the purified water outlet, so that tap water is filtered by the first filter, and the resultant purified water flows backward through the second filter and is discharged as drain water from the drain water outlet.

This filtration device can be provided with a first filter group of a plurality of filters, in place of the first filter, and a second filter group of a plurality of filters, in place of the second filter.

Effects of the Invention

According to the filtration device of the present invention, switching the communication between the tap water inlet, the first and second tap water passage ports, the first and second purified water passage ports, the purified water outlet, and the drain water outlet in the water current selector main body in accordance with a pivoting operation of the valve, can switch the filtration device between the water purification mode for letting the purified water flow out to the outside, the first backwashing mode for letting the purified water flow backward to the first filter or the first filter group to clean the filtering medium/media thereof, and the second backwashing mode for letting the purified water flow backward to the second filter or the second filter group to clean the filtering medium/media thereof. Therefore, the filters can be backwashed with purified water with a simple operation.

BRIEF DESCRIPTION OF DRAWINGS

FIG. 4A-4D is a diagram showing a lower part of a left-side cross-sectional view of the filtration device in the water purification mode, wherein
FIG. 4A is a cross section taken along A-A, FIG. 4B a cross section taken along B-B, FIG. 4C a cross section taken along C-C, and FIG. 4D a cross section taken along D-D;

FIG. 6A-6D is a diagram showing a lower part of a left-side cross-sectional view of the filtration device in the first backwashing mode, wherein FIG. 6A is a cross section taken along A-A, FIG. 6B a cross section taken along B-B, FIG. 6C a cross section taken along C-C, and FIG. 6D a cross section taken along D-D;

FIG. 8A-8D is a diagram showing a lower part of a left-side cross-sectional view of the filtration device in the second backwashing mode, wherein FIG. 8A is a cross section taken along A-A, FIG. 8B a cross section taken along B-B, FIG. 8C a cross section taken along C-C, and FIG. 8D a cross section taken along D-D;

DESCRIPTION OF EMBODIMENTS

Figure 1:
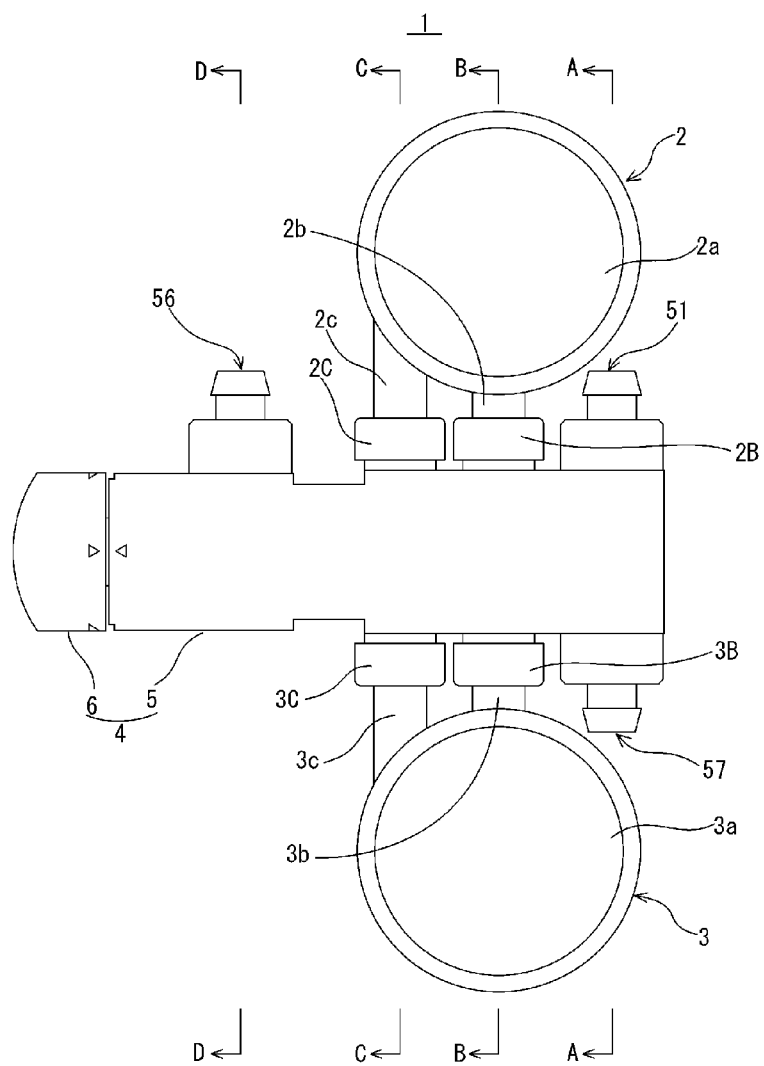
FIG. 1 is a plan view showing the exterior of a filtration device according to an embodiment of the present invention.
Figure 2:
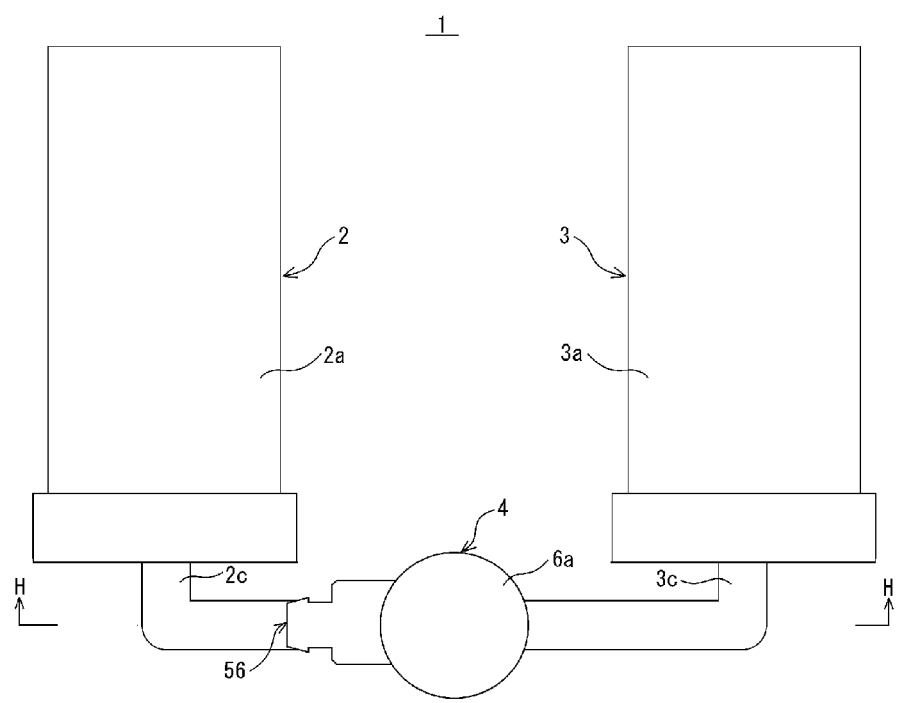
FIG. 2 is a left-side view showing the exterior of the filtration device.

A preferred embodiment for carrying out the present invention is described hereinafter with reference to the drawings. A filtration device 1 according to an embodiment of the present invention has, as shown in FIGS. 1 and 2, a first filter 2, a second filter 3, and a water current selector 4 to which the first and second filters 2 and 3 are coupled. A switching operation on the water current selector 4 can purify tap water and backwash the first and second filters 2 and 3.

The first filter 2 has a first filter main body 2a having a filtering medium therein, and a first tap water pipe 2b and first purified water pipe 2c on the side where the water current selector 4 is located. Tap water that flows in from the first tap water pipe 2b is filtered by the filtering medium, and the resultant purified water flows out of the first purified water pipe 2c. Similarly, the second filter 3 has a second filter main body 3a having a filtering medium therein, and a second tap water pipe 3b and second purified water pipe 3c on the side where the water current selector 4 is located. Tap water that flows in from the second tap water pipe 3b is filtered by the filtering medium, and the resultant purified water flows out of the second purified water pipe 3c. The materials of the filtering media are not particularly limited, but hollow fiber membranes, flat membranes, ceramic membranes, active carbon molding filters, layered filters, bobbin-type filters, metal filters and the like can be used.

Figure 3:
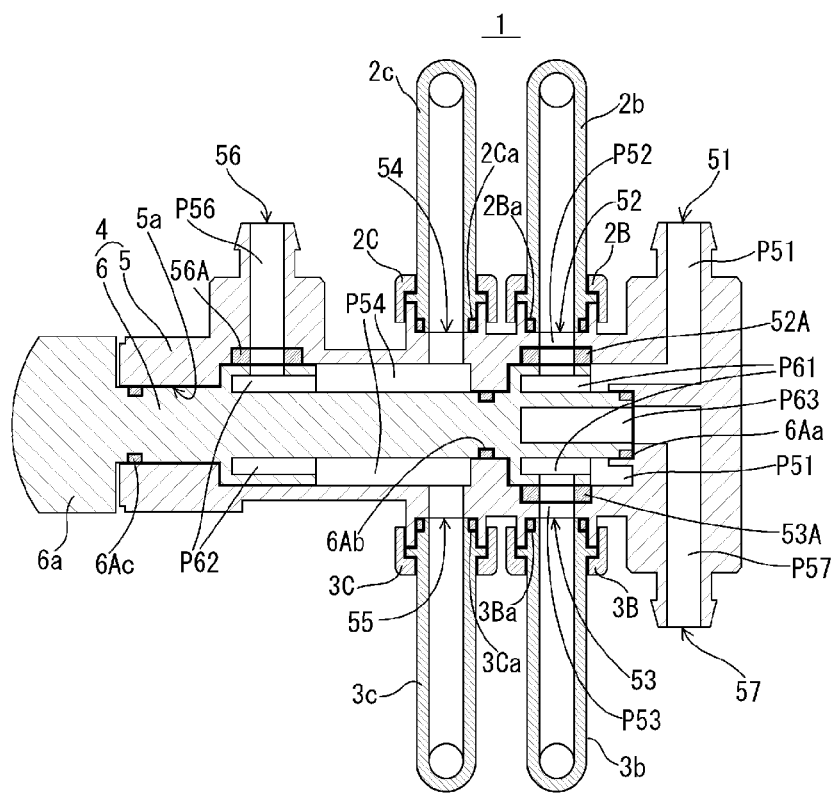
FIG. 3 is a planar cross-sectional diagram showing the filtration device in a water purification mode, taken along H-H.

As shown in FIG. 3 and the like, the water current selector 4 is configured into substantially a columnar shape by a water current selector main body 5 and a valve 6 that is pivotally fitted in a stepped hollow 5a formed in the water current selector main body 5. Inside the water current selector 4 are several water passages provided separately from each other. Note that rubber packing materials (O-rings) 2Ba, 2Ca, 3Ba, 3Ca, 52A, 53A, 56A, 6Aa, 6Ab, and 6Ac are provided to appropriate sections for the purpose of preventing water leakage between the water passages.

The water current selector main body 5 has, on an outer wall surface thereof, a tap water inlet 51, a first tap water passage port 52, a second tap water passage port 53, a first purified water passage port 54, a second purified water passage port 55, a purified water outlet 56, and a drain water outlet 57, wherein water passages, described hereinafter, are formed to allow the hollow 5a to be communicated with the outside through these ports 51, 52, 53, 54, 55, 56, and 57. Tap water flows into the tap water inlet 51. The first tap water pipe 2b and the first purified water pipe 2c of the first filter 2 are connected to the first tap water passage port 52 and the first purified water passage port 54 by connectors 2B and 2C, respectively. The second tap water pipe 3b and the second purified water pipe 3c of the second filter 3 are connected to the second tap water passage port 53 and the second purified water passage port 55 by connectors 3B and 3C, respectively.

In this embodiment, the tap water inlet 51 and the drain water outlet 57 are formed on either side, which projects slightly outward, of the outer wall surface of the water current selector main body 5, near one end of the water current selector main body 5 (as planarly viewed, the end on the side opposite to an operation gripper 6a of the valve 6, described hereinafter). The first and second tap water passage ports 52 and 53 are formed on either side of the outer wall surface at the portion nearer to another end of the water current selector main body 5 (as planarly viewed, the end on the side of the operation gripper 6a of the valve 6, described hereinafter) than the tap water inlet 51 and the drain water outlet 57. Furthermore, the first and second purified water passage ports 54 and 55 are formed on either side of the outer wall surface at the portion nearer to another end of the water current selector main body 5 than the first and second tap water passage ports 52 and 53. Furthermore, the purified water outlet 56 is formed on one side, which projects slightly outward, of the outer wall surface at the portion nearer to another end of the water current selector main body 5 than the first and second purified water passage ports 54 and 55.

In this embodiment, the water passages provided in the water current selector main body 5 are a tap water inflow passage P51 led to the tap water inlet 51, a first tap water passage P52 led to the first tap water passage port 52, a second tap water passage P53 led to the second tap water passage port 53, a purified water passage P54 led to the first and second purified water passage ports 54 and 55, a purified water outflow passage P56 led to the purified water outlet 56, and a drain water outflow passage P57 led to the drain water outlet 57.

Figure 4A:
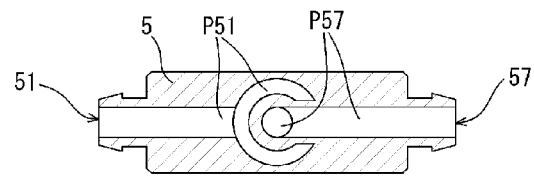

More specifically, the tap water inflow passage P51 and the drain water outflow passage P57 stretch from the tap water inlet 51 or the drain water outlet 57 toward a central axis of the water current selector 4 in such a manner as to be substantially perpendicular to the central axis. The drain water outflow passage P57 stretches to the central axis (see FIG. 4A and the like), is bent toward another end of the water current selector main body 5 by means of a circular hole formed coaxially with the central axis, and is led to a third flow passage P63 of the valve 6, which is described hereinafter (see FIG. 3 and the like). The tap water inflow passage P51 expands circumferentially in the vicinity of the central axis so as to sandwich the drain water outflow passage P57 (see FIG. 4A and the like), is bent toward another end of the water current selector main body 5 while enclosing the circular hole of the drain water outflow passage P57, and is led to a first flow passage P61 of the valve 6, which is described hereinafter (see FIG. 3 and the like).

Figure 4B:
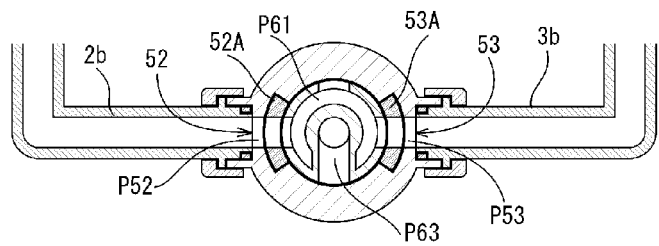

The first and second tap water passages P52 and P53 stretch from the first or second tap water passage port 52 or toward the central axis in such a manner as to be substantially perpendicular to the central axis. The first and second tap water passages P52 and P53 are led to the first or third flow passage P61 or P63 of the valve 6, described hereinafter, depending on a pivot position of the valve 6 (see FIG. 4B and the like), via the rubber packing materials 52A and 53A.

Figure 4C:
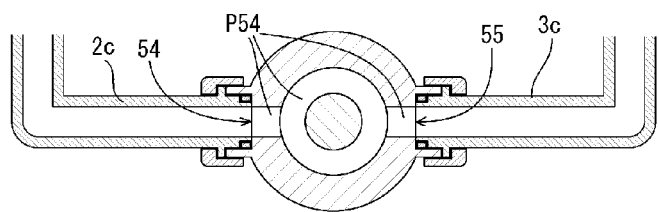

The purified water passage P54 stretches from the first and second purified water passage ports 54 and 55 towards the central axis in such a manner as to be substantially perpendicular to the central axis, expands circumferentially in the vicinity of the central axis, and is connected (see FIG. 4C and the like). The purified water passage P54 is bent toward another end of the water current selector main body 5 while enclosing the valve 6 and is led to a second flow passage P62 of the valve 6, which is described hereinafter (see FIG. 3 and the like).

Figure 4D:
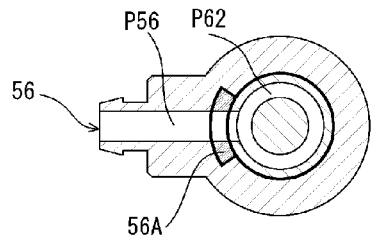

The purified water outflow passage P56 stretches from the purified water outlet 56 toward the central axis in such a manner as to be substantially perpendicular to the central axis, and is led to or blocked from the second flow passage P62 of the valve 6, described hereinafter, depending on the pivot position of the valve 6 (see FIG. 4D and the like), via the rubber packing material 56A.

Next, the valve 6 is described. The valve 6 has a valve functional part fitted in the hollow 5a of the water current selector main body 5, and the operation gripper 6a projecting (exposed) from the hollow 5a.

The inside of the valve functional part of the valve 6 is provided with the water passages for switching the communication between the tap water inlet 51, the first and second tap water passage ports 52 and 53, the first and second purified water passage ports 54 and 55, the purified water outlet 56, and the drain water outlet 57 in the water current selector main body 5 depending on the pivot position of the valve 6. With the water passages provided in the valve functional part, the filtration device 1 can be switched between a water purification mode for filtering tap water to let the resultant purified water flow to the outside, a first backwashing mode for causing the purified water to flow backward to the first filter to wash the filtering medium thereof, and a second backwashing mode for causing the purified water to flow backward to the second filter to wash the filtering medium thereof.

In this embodiment, the water passages provided inside the valve 6 are the first flow passage P61, the second flow passage P62, and the third flow passage P63. The first backwashing mode is set by rotating the pivot position of the valve 6 in the water purification mode 90 degrees clockwise (in a left-side view), and the second backwashing mode is set by rotating the pivot position of the valve 6 in the water purification mode 90 degrees counterclockwise (in the left-side view). The specific angular interval is not limited to 90 degrees and can be set according to the specifications as long as it is less than 180 degrees. In addition, the first backwashing mode can be set by rotating the pivot position of the valve 6 in the water purification mode counterclockwise, and the second backwashing mode can be set by rotating the same clockwise.

In the water purification mode, the tap water inlet 51 of the water current selector main body 5 is in communication with the first and second tap water passage ports 52 and 53, and the first and second purified water passage ports 54 and 55 are in communication with the purified water outlet 56, as shown in FIGS. 3 and 4. As a result, tap water is filtered by the first and second filters 2 and 3, and the resultant purified water is let flow out of the purified water outlet 56 to the outside.

Specifically, while the first flow passage P61 is connected to the first and second tap water passages P52 and P53, the second flow passage P62 is connected to the purified water outflow passage P56. The third flow passage P63 is blocked from the first and second tap water passages P52 and P53. The tap water flows from the tap water inlet 51 to the first and second tap water passages P52 and P53 through the tap water inflow passage P51 and the first flow passage P61. The tap water flowing into the first tap water passage P52 passes through the first tap water pipe 2b and is then filtered by the filtering medium of the first filter 2, resulting in purified water. This purified water flows into the purified water passage P54 through the first purified water pipe 2c. The tap water flowing into the second tap water passage P53 passes through the second tap water pipe 3b and is then filtered by the filtering medium of the second filter 3, resulting in purified water. This purified water flows into the purified water passage P54 through the second purified water pipe 3c. The purified water then flows out of the purified water outlet 56 to the outside via the purified water outflow passage P56. The impurities contained in the tap water are trapped and accumulate in a part of the filtering medium of the first filter 2 on the first tap water pipe 2b side and a part of the filtering medium of the second filter 3 on the second tap water pipe 3b side.

Figure 5:
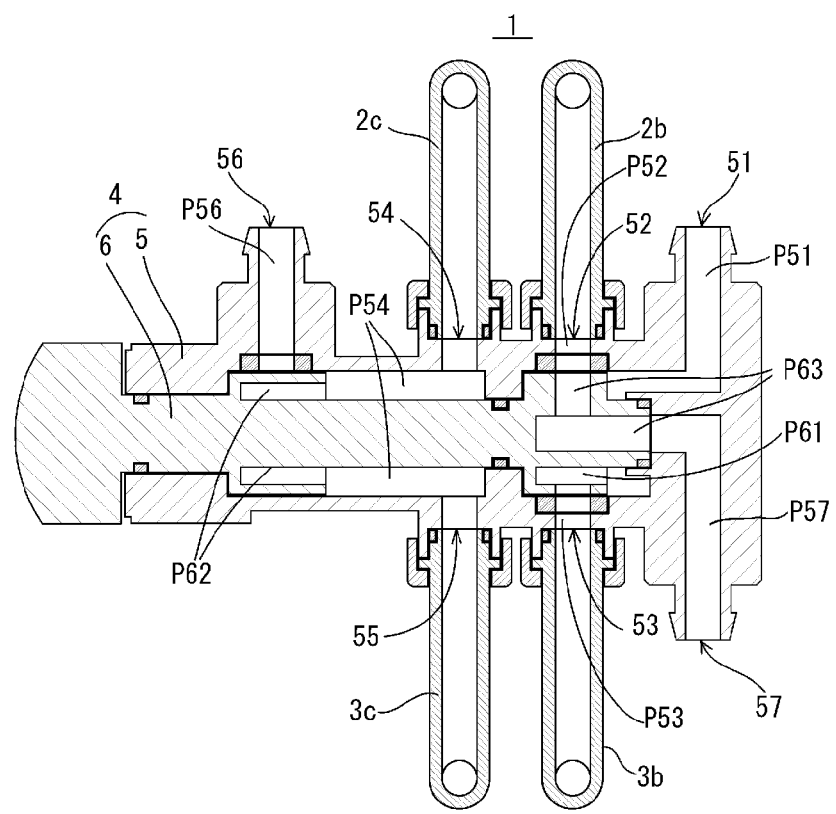
FIG. 5 is a planar cross-sectional diagram showing the filtration device in a first backwashing mode, taken along H-H.
Figure 6A:
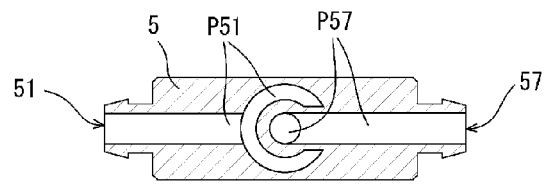
Figure 6B:
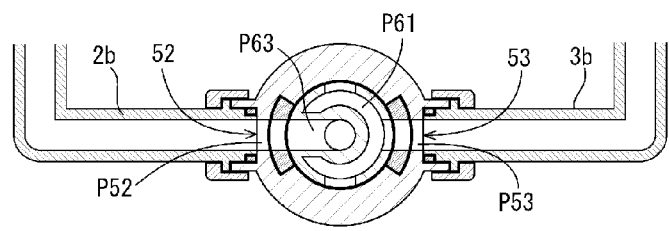
Figure 6C:
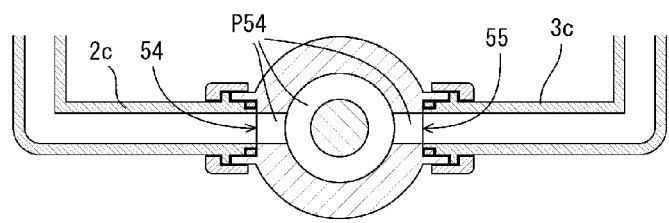
Figure 6D:
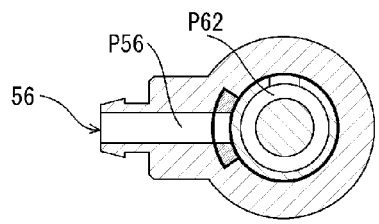

In the first backwashing mode, as shown in FIGS. 5 and 6, while the tap water inlet 51 of the water current selector main body 5 is in communication with the second tap water passage port 53, and the drain water outlet 57 is in communication with the first tap water passage port 52, the first and second purified water passage ports 54 and 55 are blocked from communication with the purified water outlet 56. As a result, tap water is filtered by the second filter 3, and the resultant purified water flows backward through the first filter 2, resulting in discharge of the drain water from the drain water outlet 57.

More specifically, the first flow passage P61 is connected to the second tap water passage P53, and the third flow passage P63 to the first tap water passage P52. The second flow passage P62 is blocked from the purified water outflow passage P56. Tap water flows from the tap water inlet 51 into the second tap water passage P53 through the tap water inflow passage P51 and the first flow passage P61. The tap water flowing into the second tap water passage P53 passes through the second tap water pipe 3b and is then filtered by the filtering medium of the second filter 3, resulting in purified water. This purified water flows into the purified water passage P54 through the second purified water pipe 3c. The purified water then passes through the first purified water pipe 2c and through the filtering medium of the first filter 2 in the direction opposite to the direction of the flow of the purified water in the water purification mode, and becomes water containing impurities accumulated in the filtering medium, i.e., drain water. This drain water flows into the first tap water passage P52 through the first tap water pipe 2b. The drain water is then discharged from the drain water outlet 57 via the third flow passage P63 and the drain water outflow passage P57.

Figure 7:
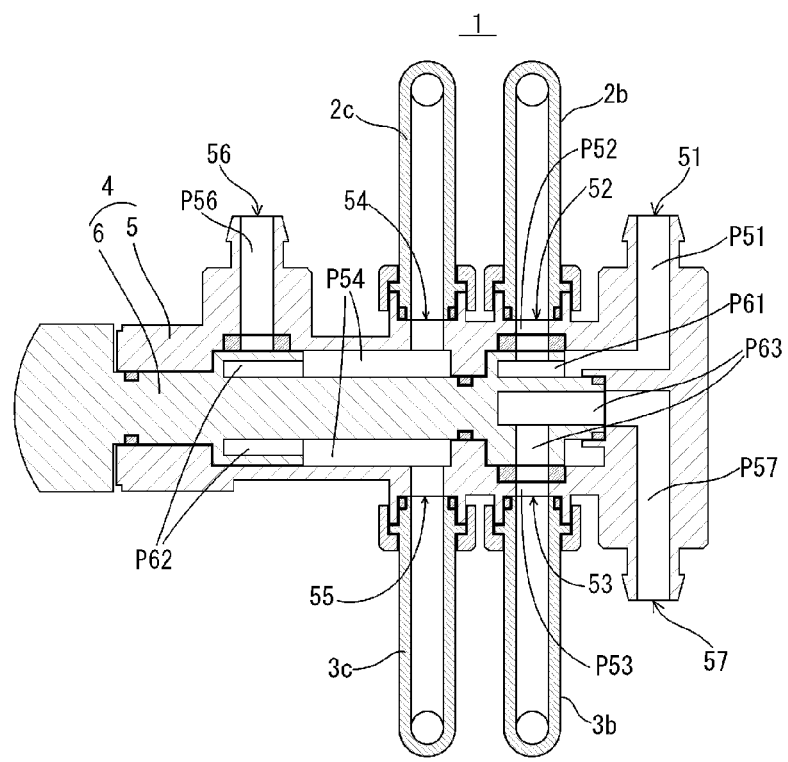
FIG. 7 is a planar cross-sectional diagram showing the filtration device in a second backwashing mode, taken along H-H.
Figure 8A:
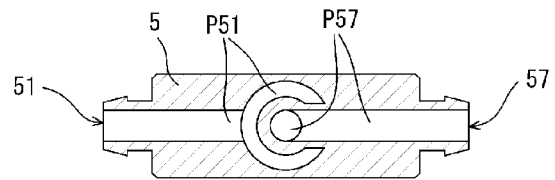
Figure 8B:
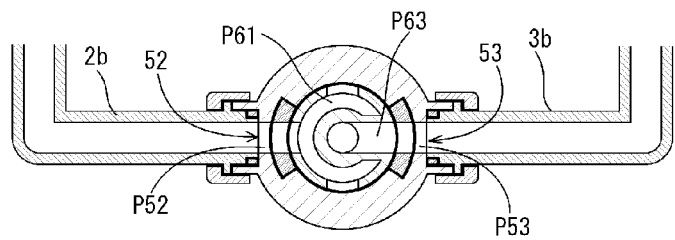
Figure 8C:
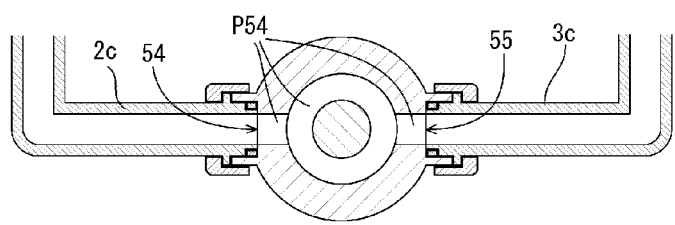
Figure 8D:
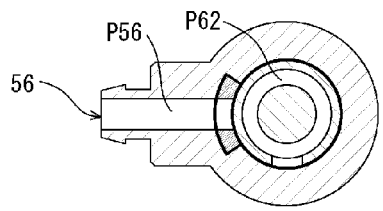

In the second backwashing mode, as shown in FIGS. 7 and 8, while the tap water inlet 51 of the water current selector main body 5 is in communication with the first tap water passage port 52, and the drain water outlet 57 is in communication with the second tap water passage port 53, and the first and second purified water passage ports 54 and 55 are blocked from communication with the purified water outlet 56. As a result, tap water is filtered by the first filter 2, and the resultant purified water flows backward through the second filter 3 and is discharged from the drain water outlet 57.

More specifically, the first flow passage P61 is connected to the first tap water passage P52, and the third flow passage P63 to the second tap water passage P53. The second flow passage P62 is blocked from the purified water outflow passage P56. Tap water flows from the tap water inlet 51 into the first tap water passage P52 through the tap water inflow passage P51 and the first flow passage P61. The tap water flowing into the first tap water passage P52 passes the first tap water pipe 2b and is then filtered by the filtering medium of the first filter 2, resulting in purified water. This purified water flows into the purified water passage P54 through the first purified water pipe 2c. The purified water then passes through the second purified water pipe 3c and through the filtering medium of the second filter 3 in the direction opposite to the direction of the flow of the purified water in the water purification mode, and becomes water containing impurities accumulated in the filtering medium, i.e., drain water. This drain water flows into the second tap water passage P53 through the second tap water pipe 3b. The drain water is then discharged from the drain water outlet 57 via the third flow passage P63 and the drain water outflow passage P57.

Such a simple operation involving only a pivoting operation of the valve 6 is capable of switching the communication between the tap water inlet 51, the first and second tap water passage ports 52 and 53, the first and second purified water passage ports 54 and 55, the purified water outlet 56, and the drain water outlet 57 in the water current selector main body 5, thereby is capable of switching between the water purification mode, the first backwashing mode, and the second backwashing mode.

Figure 9:
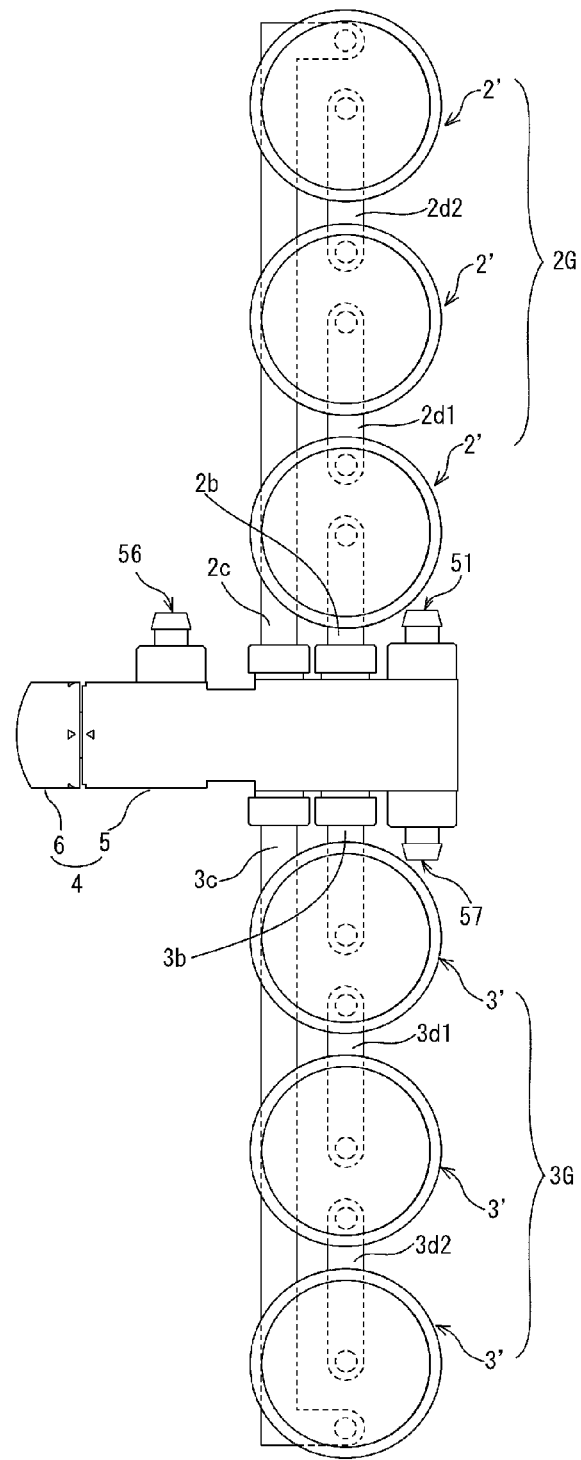
FIG. 9 is a reduced plan view showing the exterior of a modification of the filtration device.
Figure 10:
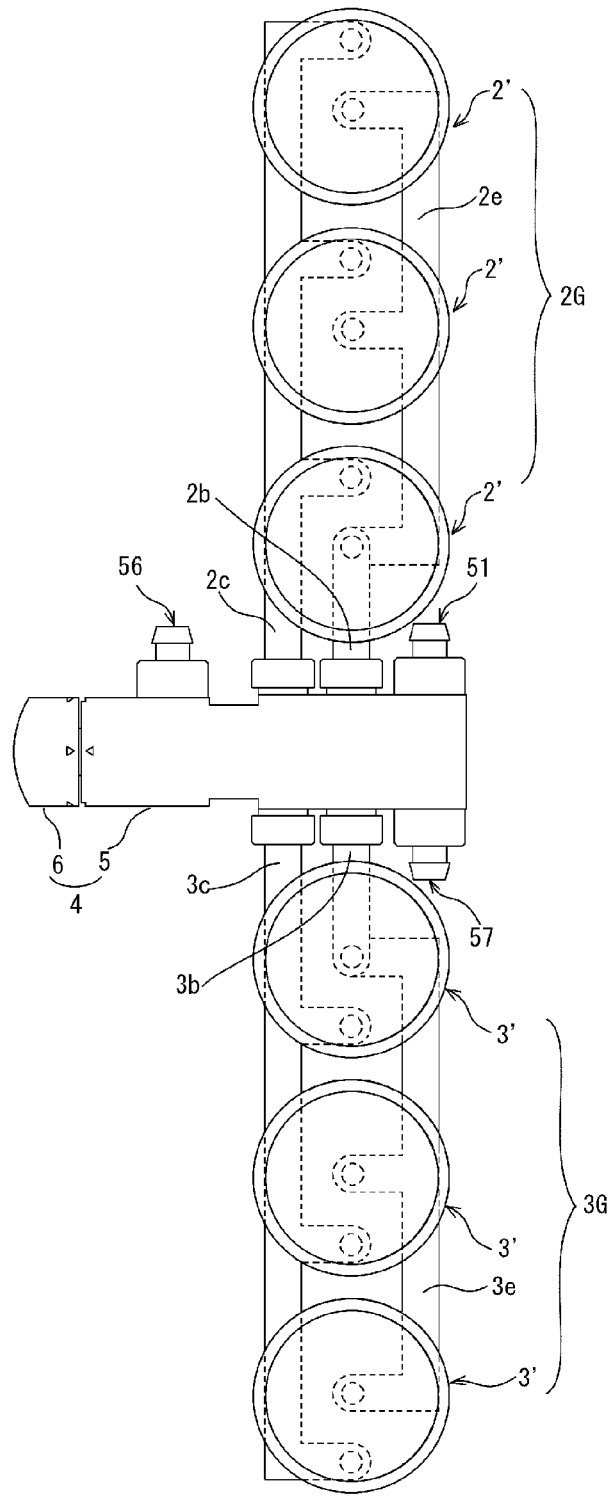
FIG. 10 is a reduced plan view showing the exterior of another modification of the filtration device.

Such a filtration device 1 can also be provided with a first filter group 2G of a plurality of filters 2', 2' etc. in place of the first filter 2, and a second filter group 3G of a plurality of filters 3', 3' etc. in place of the second filter 3. More specifically, the first filter group 2G can be configured by serially connecting the plurality of filters 2', 2' etc. of different filtering performances as shown in FIG. 9, or by connecting the plurality of filters 2', 2' etc. in parallel in such a way as to enhance the water treating process thereof as shown in FIG. 10. Alternatively, although not shown, the plurality of filters 2', 2' etc. can be connected both in series and in parallel, which is the combination of the serial connection and parallel connection described above. The same applies to the second filter group 3G.

In the first filter group 2G shown in FIG. 9, when tap water flows in through the first tap water pipe 2b, tap water is filtered sequentially by the filtering media of the plurality of filters 2', 2' etc. that are coupled to each other by connecting pipes 2d1 and 2d2, and the resultant purified water is let flow out of the first purified water pipe 2c. In the second filter group 3G, when tap water flows in through the second tap water pipe 3b, tap water is filtered sequentially by the filtering media of the plurality of filters 3', 3' etc. that are coupled to each other by connecting pipes 3d1 and 3d2, and the resultant purified water is let flow out of the second purified water pipe 3c. Note that in FIG. 9 (and FIG. 10), as planarly viewed, while the filters 2' are rotated 90 degrees clockwise from the orientation of the first filter 2, the filters 3' are rotated 90 degrees counterclockwise from the orientation of the second filter 3.

In the first filter group 2G shown in FIG. 10, when tap water flows in through the first tap water pipe 2b, tap water is filtered simultaneously by the filtering media of the plurality of filters 2', 2' etc. that are coupled to each other by a connecting pipe 2e, and the resultant purified water is let flow out of the first purified water pipe 2c. In the second filter group 3G, when tap water flows in from the second tap water pipe 3b, tap water is filtered simultaneously by the filtering media of the plurality of filters 3', 3' etc. that are coupled to each other by a connecting pipe 3e, and the resultant purified water is let flow out of the second purified water pipe 3c.

The above has described the filtration device 1 according to an embodiment of the present invention; however, the present invention is not limited to the embodiment, and various design changes can be made within the scope of the matters described in the claims. For instance, specific positions in the water current selector main body 5 for disposing the tap water inlet 51, the first and second tap water passage ports 52 and 53, the first and second purified water passage ports 54 and 55, the purified water outlet 56, and the drain water outlet 57, and the shapes and the like of the water passages to be formed in the water current selector main body 5 and the valve 6 can appropriately be changed.

EXPLANATIONS OF REFERENCE NUMERALS

1 Filtration device
2 First filter
2a First filter main body
2b First tap water pipe
2c First purified water pipe
2G First filter group
3 Second filter
3a Second filter main body
3b Second tap water pipe
3c Second purified water pipe
3G Second filter group
4 Water current selector
5 Water current selector main body
5a Hollow
51 Tap water inlet
52 First tap water passage port
53 Second tap water passage port
54 First purified water passage port
55 Second purified water passage port
56 Purified water outlet
57 Drain water outlet
6 Valve

The invention claimed is:

1. A filtration device, comprising:
a water current selector, which is configured by a water current selector main body that has, on an outer wall surface thereof, a tap water inlet receiving a flow of tap water, first and second tap water passage ports, first and second purified water passage ports, a purified water outlet, and a drain water outlet, and a valve that is pivotally fitted in a hollow formed in the water current selector main body;
a first filter that has a first tap water pipe and a first purified water pipe connected to the first tap water passage port and the first purified water passage port, respectively; and
a second filter that has a second tap water pipe and a second purified water pipe connected to the second tap water passage port and the second purified water passage port, respectively,
wherein:
when the valve is in a pivot position corresponding to a water purification mode, the tap water inlet is in communication with the first and second tap water passage ports, and the first and second purified water passage ports are in communication with the purified water outlet, so that tap water is filtered by the first and second filters and the resultant purified water flows out of the purified water outlet to the outside;
when the valve is in a pivot position corresponding to a first backwashing mode, while the tap water inlet is in communication with the second tap water passage port and the drain water outlet is in communication with the first tap water passage port, a portion of an outer circumference of the valve is positioned to completely block the first and second purified water passage ports from all communication with the purified water outlet, so that tap water is filtered by the second filter, and the resultant purified water flows backward through the first filter and is discharged as drain water from the drain water outlet; and when the valve is in a pivot position corresponding to a second backwashing mode, while the tap water inlet is in communication with the first tap water passage port and the drain water outlet is in communication with the second tap water passage port, a portion of the outer circumference of the valve is positioned to completely block the first and second purified water passage ports from all communication with the purified water outlet, so that tap water is filtered by the first filter, and the resultant purified water flows backward through the second filter and is discharged as drain water from the drain water outlet.

2. The filtration device according to claim 1, comprising a first filter group of a plurality of filters, in place of the first filter, and a second filter group of a plurality of filters, in place of the second filter.

\* \* \* \* \*